United States Patent
Uchida et al.

(10) Patent No.: US 10,373,356 B2
(45) Date of Patent: Aug. 6, 2019

(54) PRESENTATION SYSTEM AND DISPLAY APPARATUS FOR USE IN THE PRESENTATION SYSTEM

(71) Applicant: MAXELL, LTD., Kyoto (JP)

(72) Inventors: Yoshiharu Uchida, Yokohama (JP); Shinji Onodera, Yokohama (JP); Satomi Morishita, Yokohama (JP); Kenichi Iwahara, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 14/790,685

(22) Filed: Jul. 2, 2015

(65) Prior Publication Data
US 2015/0302626 A1    Oct. 22, 2015

Related U.S. Application Data

(63) Continuation of application No. 12/912,876, filed on Oct. 27, 2010, now Pat. No. 9,098,195.

(30) Foreign Application Priority Data

Oct. 29, 2009 (JP) .................... 2009-248977

(51) Int. Cl.
*G06F 3/042* (2006.01)
*G06F 3/01* (2006.01)
(Continued)

(52) U.S. Cl.
CPC ............ *G06T 11/60* (2013.01); *G06F 3/0425* (2013.01); *G06F 3/04817* (2013.01);
(Continued)

(58) Field of Classification Search
CPC ............... G06F 3/00; G06F 3/048; G06F 3/14
(Continued)

(56) References Cited

U.S. PATENT DOCUMENTS

| 4,652,862 A * | 3/1987 | Verslycken ............. E05B 47/00 |
|---|---|---|
| | | 109/21 |
| 2003/0216891 A1 | 11/2003 | Wegener |

(Continued)

FOREIGN PATENT DOCUMENTS

| JP | 2002-014664 A | 1/2002 |
|---|---|---|
| JP | 2002-032069 A | 1/2002 |

(Continued)

OTHER PUBLICATIONS

Decision to Grant a Patent issued in Japanese Patent Application No. 2013-260925 dated May 12, 2015 (English translation attached).

(Continued)

*Primary Examiner* — Doon Y Chow
*Assistant Examiner* — Le V Nguyen
(74) *Attorney, Agent, or Firm* — Mattingly & Malur, PC

(57) ABSTRACT

A display device according synthesizes icons and messages with a portion where no descriptive display image is displayed by OSD for display. Icon functions are set by a PC so that the setting of the operation of the PC and the display device, and the setting of an external device can be conducted. The number of lines of the message to be displayed is determined according to distortion correction at the case of oblique projection to correct position coordinates detected by a camera. In a presentation system including an interactive white board device, the display device (for example, a liquid crystal projector), and the PC, the display of the icons are improved to extend the functions, and the display of the messages at the case of oblique projection, and a position detection precision on a screen by the camera incorporated into the display device are improved.

2 Claims, 14 Drawing Sheets

(51) Int. Cl.
*G06T 11/60* (2006.01)
*G06F 3/0481* (2013.01)
*G06F 3/0488* (2013.01)
*H04N 5/445* (2011.01)
*H04N 9/31* (2006.01)
*H04N 21/41* (2011.01)
*H04N 21/4143* (2011.01)
*H04N 21/422* (2011.01)
*H04N 21/4223* (2011.01)
*H04N 21/4363* (2011.01)

(52) U.S. Cl.
CPC ..... *G06F 3/04886* (2013.01); *H04N 5/44504* (2013.01); *H04N 9/3185* (2013.01); *H04N 21/4122* (2013.01); *H04N 21/4143* (2013.01); *H04N 21/4223* (2013.01); *H04N 21/42202* (2013.01); *H04N 21/43632* (2013.01)

(58) Field of Classification Search
USPC .................................................. 715/863, 752
See application file for complete search history.

(56) References Cited

U.S. PATENT DOCUMENTS

| | | | |
|---|---|---|---|
| 2003/0222892 A1 | 12/2003 | Diamond et al. | |
| 2004/0061838 A1 | 4/2004 | Mochizuki et al. | |
| 2005/0168705 A1 | 8/2005 | Li et al. | |
| 2005/0225729 A1* | 10/2005 | Kobayashi | G03B 21/26 353/30 |
| 2005/0270496 A1 | 12/2005 | Mochizuki | |
| 2006/0064716 A1* | 3/2006 | Sull | G06F 17/30793 725/37 |
| 2008/0109724 A1* | 5/2008 | Gallmeier | G06F 3/017 715/716 |
| 2009/0115722 A1 | 5/2009 | Shan et al. | |
| 2009/0195695 A1* | 8/2009 | Kawade | H04N 5/44513 348/564 |
| 2009/0225235 A1* | 9/2009 | Fujisaki | H04N 9/3185 348/745 |
| 2009/0278999 A1 | 11/2009 | Ofune et al. | |
| 2010/0099456 A1* | 4/2010 | Kim | G06F 3/0346 455/556.1 |
| 2010/0309391 A1 | 12/2010 | Plut | |
| 2012/0002021 A1* | 1/2012 | Matsumura | H04N 5/4403 348/51 |

FOREIGN PATENT DOCUMENTS

| | | |
|---|---|---|
| JP | 2002-366343 A | 12/2002 |
| JP | 2003-276399 A | 9/2003 |
| JP | 2005-323389 A | 11/2005 |
| JP | 2006-092269 A | 4/2006 |
| JP | 2007-164561 A | 6/2007 |
| JP | 2007-279220 A | 10/2007 |
| WO | WO 2009/108123 A1 | 9/2009 |

OTHER PUBLICATIONS

Office Action issued in Japanese Patent Application No. 2009-248977 dated Sep. 3, 2013.

JP Office Action dated Jan. 6, 2015 in JP Patent Application No. 2013-260925.

Extended European Search Report in European Patent Application No. 10014087.0 dated Feb. 6, 2013.

* cited by examiner

FIG. 10

| DISPLAY POSITION | | Bitmap FILE NO. | ICON FUNCTION | DISPLAY PRESENCE/ ABSENCE |
|---|---|---|---|---|
| VERTICAL | HORIZONTAL | | | |
| 00····01 | 00····11 | 00000010 | PEN SIZE | 0 (PRESENCE) |
| 00····11 | 00····11 | 00001010 | PEN COLOR | 0 (PRESENCE) |
| 01····00 | 10····00 | 00101001 | PAGE UP | 0 (PRESENCE) |
| 11····00 | 10····00 | 00111010 | NOTHING | 1 (ABSENCE) |

1001 1002 1003 1004

PRESENTATION SYSTEM AND DISPLAY APPARATUS FOR USE IN THE PRESENTATION SYSTEM

CROSS REFERENCE TO RELATED APPLICATION

This application is a continuation of U.S. patent application Ser. No. 12/912,876, filed Oct. 27, 2010, which claims priority to Japanese Patent Application No. 2009-248977, filed Oct. 29, 2009. The contents of both applications are hereby incorporated by reference into this application.

BACKGROUND OF THE INVENTION

The present invention relates to a presentation system, and a display device for use in the presentation system, and more particularly to a presentation system that improves display of icons and messages, and a display device for the presentation system.

In a presentation system used for demonstration in rollout, reduction in size and weight and reduction in projector distance has been advanced to improve the usability of a user. In particular, because a person (hereinafter referred to as "presenter") who conducts presentation requires a system that facilitates description, a technique by which the position of an electrical pen (also called "pointer") to be used is rapidly and precisely detected is important.

JP-A-2003-276399 discloses a technique in which there are provided a screen having a light permeability, an electrical pen that emits a light having a predetermined wavelength while traveling on the screen, and an infrared camera that receives the light that has been emitted from the electrical pen and transmitted to a back side of the screen to detect the position of the electrical pen to precisely detect the position of the electrical pen on an interactive white board.

SUMMARY OF THE INVENTION

For the purpose of providing an interactive white board system that is improved in usability for not only the presenter but also a person to whom the presentation is given (hereinafter referred to as "presentation participant"), it is conceivable that, for example, icon or message display on the interactive white board needs to be further devised.

The interactive white board is provided with an interface for allowing the presenter to conduct, on the interactive white board, the operation of paging up a presentation document, or switching over the displayed color or size of a line traced with an electrical pen, for example. This removes the burden that the presenter directly operates a PC (person computer) connected with the interactive white board and controlling the display.

As the conventional interface, there is an example in which icons are printed directly on the interactive white board. Also, there is an example in which the PC side is provided with a display application including the icons, and displayed on the interactive white board together with a descriptive display image.

When the presenter touches the icon on the interactive white board with the electrical pen, position coordinate detection sensors incorporated into the interactive white board read designated position information, and transmit the position information to the connected PC. The application on the PC that has received the position information identifies the function of PC operation associated with the icon which is located at the position coordinates, and executes the function. With this operation, the operation of paging up the presentation document and so on as described above is conducted.

As a method of detecting the operation of the presenter, there are position coordinate detection sensors of the type in which the electrical pen uses a pressure generated when the electrical pen touches the interactive white board. Also, unless the electrical pen directly touches the interactive white board, the position of the electrical pen can be detected by allowing electromagnetic waves such as infrared rays to be emitted from the electrical pen, and then received by the interactive white board. Also, the position coordinate detection sensors are arranged on the interactive white board with high precision so as to detect the position with precision of every pixel or every several pixels of a display screen. For example, the sensors are arranged with a high density so as to detect the position over the entire surface of the interactive white board with high precision. For that reason, the presenter can write on the display screen described above with the pen.

However, in the above-mentioned method, some matters to be further improved are indicated. First, when the icons are printed directly on the interactive white board, naturally, the display position of the icons cannot be changed over, and a new function cannot be added, or the function cannot be extended. Even when the display application including the icons is provided at the PC side, because the function and display position of the icons are fixed conventionally, the same problem arises. Because the icons that are the interface for the PC operation are configured as described above, the icons are superimposed on the descriptive display image up to now, and prevent the presentation participant from visually recognizing the descriptive display image. Also, the presenter must be moved from the standing position for operating the icons depending on the position at which the presenter stands. Thus, the icons prevent the presentation from proceeding smoothly. In addition, there is a proposal to display messages at the same location instead of the display of the icons. However, problems occurring in association with this proposal have not been sufficiently considered.

The present invention has been made in view of the above circumstances, and therefore an object of the present invention is to provide a presentation system that improves the display of icons and messages, and a display device for the presentation system.

In order to achieve the above object, according to the present invention, there is provided a presentation system including: an interactive white board device having a display section for an image; a display device that optically emits an image to the interactive white board device to display the image; and a system control device that stores a presentation image which is supplied to the display device, and controls the operation of the display device, wherein the display device includes an OSD display control section that generates an icon display image on the basis of control information supplied from the system control device, and an OSD synthesis processing section that synthesizes the presentation image supplied from the system control device with the icon display image generated by the OSD display control section without superimposition with each other to generate a display image to be displayed on the interactive white board.

Also, according to the present invention, there is provided a presentation system including: an interactive white board device having a display section for an image; a display device that optically emits an image to the interactive white board device to display the image; and a system control device that stores a presentation image which is supplied to the display device, and controls the operation of the display device, wherein the display device includes an OSD display control section that generates a message display image on the basis of control information supplied from the system control device, and an OSD synthesis processing section that synthesizes the presentation image supplied from the system control device with the message display image generated by the OSD display control section without superimposition with each other to generate a display image to be displayed on the interactive white board.

Further, according to the present invention, there is provided a display device for use in a presentation system, which optically emits an image to an interactive white board device having a display section of the image for displaying the image, the display device including: a display device control section that controls the operation of the display device; an image processing section that reduces a first image input to the display device in a vertical direction to generate a second image on the basis of a command related to a projection angle to the interactive white board from the display device control section; an OSD display control section that generates a third image which is displayed together with the second image on the basis of a command from the display device control section; an OSD synthesis processing section that synthesizes the second image and the third image without superimposition with each other to generate a fourth image; a distortion correction processing section that reduces the fourth image in a horizontal direction according to a vertical position of the fourth image on the basis of the command related to the projection angle to the interactive white board from the display device control section to generate a fifth image; and an optical display section that optically emits the fifth image to the interactive white board, wherein the display device control section controls the OSD display control section so as to reduce the third image in the vertical direction according to the reduction processing of the first image in the vertical direction in the image processing section.

According to the present invention, there can be provided the presentation system that improves the display of the icons and the messages, and the display device for use in the presentation system, which can contribute to an improvement in the usability for a user.

BRIEF DESCRIPTION OF THE DRAWINGS

These and other features, objects and advantages of the present invention will become more apparent from the following description when taken in conjunction with the accompanying drawings wherein:

FIG. 10 is a diagram illustrating a format of icon information according to the embodiment of the present invention;

DESCRIPTION OF THE PREFERRED EMBODIMENTS

Hereinafter, embodiments of the present invention will be described with reference to the accompanying drawings.

Figure 1:
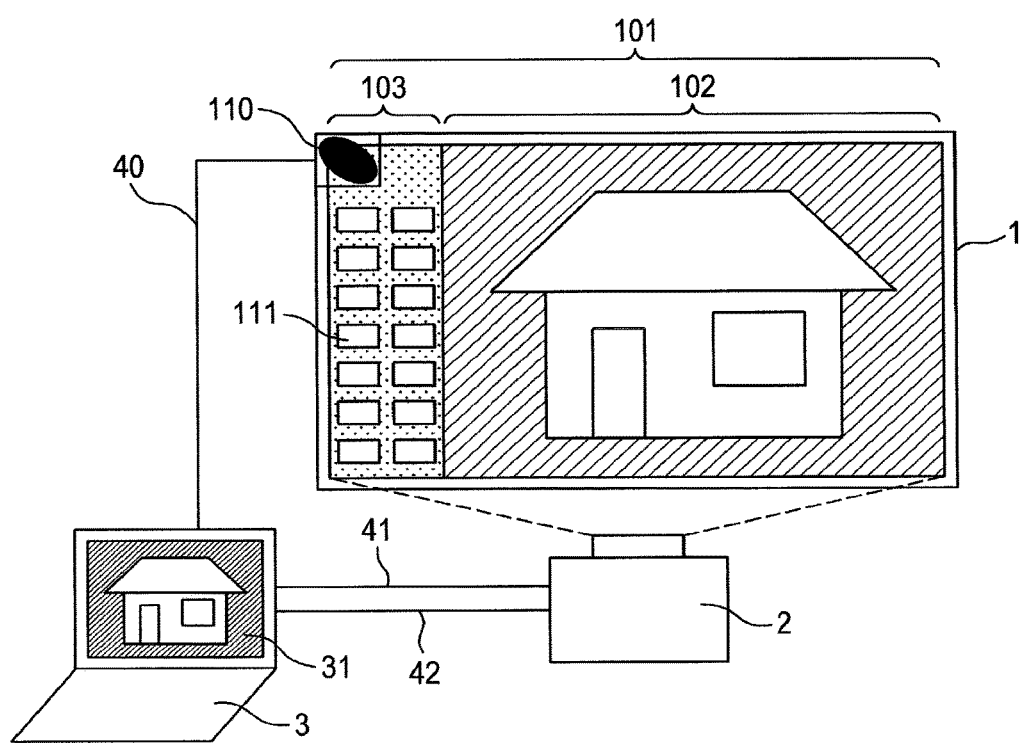
FIG. 1 is a block diagram illustrating a presentation system according to an embodiment of the present invention.

FIG. 1 is a block diagram illustrating a presentation system according to an embodiment of the present invention. The presentation system includes an interactive white board device 1, a display device 2 using, for example, a liquid crystal projector, and a PC (also called "system control device") 3 that controls the entire system. The interactive white board device 1 and the PC 3 are connected to each other through a communication cable 40 such as a USB (universal serial bus). With the use of this communication cable 40, the interactive white board device 1 transmits information including position coordinate detection information of an electrical pen described above to the PC 3. The display device 2 and the PC 3 are connected to each other through an image cable 41, and the PC 3 transmits an information signal for display to the display device 2. A communication cable 42 is also used to connect the display device 2 and the PC 3 on the basis of the standards of, for example, RS-232C (recommended standard-232C) and an LAN (local area network). The PC 3 controls the operation of the display device 2. The display device 2 optically transmits a display image to the interactive white board device 1, and displays the display image on a display section thereof.

A display section 101 of the interactive white board device 1 includes a display section 102 of a descriptive display image, and a display section 103 of, for example, icons. The display of the display section 102 and the display of the display section 103 are synthesized by using an OSD (on screen display) function provided to the display device 2 as will be described later. In this example, the display section 103 is arranged on a left end side of the screen. In the display section 102 is displayed an image shown in a display 31 provided to the PC 3 as shown in FIG. 1. The image is supplied from the PC 3 to the display device 2 through the above-mentioned image cable 41.

As described above, position coordinate detection sensors 110 detect a position indicated by an electrical pen (not shown) with precision of every pixel or every several pixels of the display section 101, and transmit position information to the PC 3 through the communication cable 40. The position coordinate detection sensors 110 are located in the upper left of the interactive white board device 1, and so configured as to detect the position coordinates of the entire screen in FIG. 1. Alternatively, the position coordinate detection sensors 110 may be configured to be located on the substantially entire surface of the display section 101 with high density.

In the display section 103 are displayed icons 111. In the PC 3 are stored plural bit map files so that the respective icons 111 display different images. A presenter operates the PC 3 before presentation so as to set a display position of each icon 111 and the presence or absence of the display in advance. The display position of the icons 111 is set on the basis of the position information provided in the position coordinate detection sensors 110. Information for generating the icons 111 shown in the display section 103 is set by the PC 3 and registered in an internal memory, together with the bit map files and the information on the display position. The information is further supplied from the PC 3 to the display device 2 through the above-mentioned communication cable 42.

When the presenter points at any one of the icons 111 with the electrical pen, the position coordinate detection sensors 110 detect the pointed position, for example, by the aid of a pressure or an electromagnetic wave. When the detected position information is transmitted to the PC 3, the PC 3 knows which icon has been selected, and starts, for example, application associated with the selected icon. When the selected icon is related to the operation of the PC 3, the application controls the PC 3. When the selected icon is related to the operation of the display device 2, the application transmits a control command to the display device 2 through the communication cable 42.

The image displayed in the display section 102 and the image displayed in the display section 103 are synthesized in an OSD synthesis section included in the display device 2 on the basis of a control from the PC 3, and displayed in the display section 101.

Figure 2:
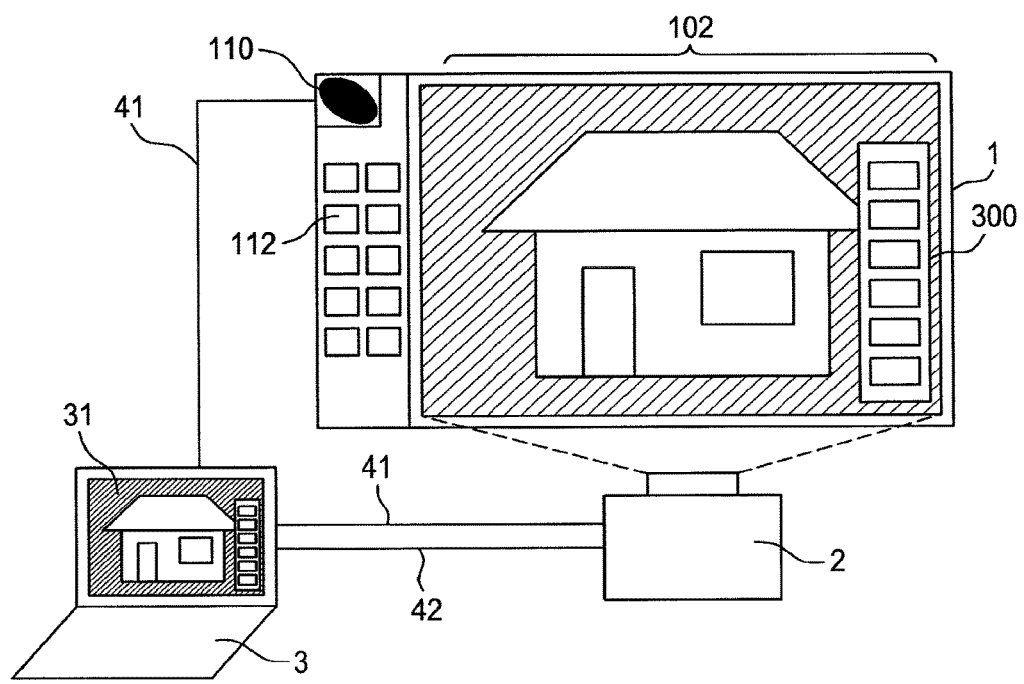
FIG. 2 is a block diagram illustrating a conventional presentation system.

FIG. 2 is a block diagram of a conventional presentation system. After description of the conventional example with reference to FIG. 2, the features of the present invention will be described by comparing FIG. 1 with FIG. 2.

In FIG. 2, components that can be identical with those in FIG. 1 are denoted by the same symbols. Icons 112 are located, for example, at the left end side of the screen in the interactive white board device 1 by printing. The display device 2 can display the descriptive display image while avoiding the left end side. However, because the position of the icons 112 is fixed, the descriptive display image may be superimposed on the icons 112 according to the setting status. Also, there is a case in which the PC 3 allows an icon group 300 to be located inside the display section 102, and transmits the display image to the display device 2. The icons 112 are fixed, and the display position and the presence or absence of the display cannot be switched. Further, although the icon group 300 can have the display position moved within a region of the display section 102, because the icon group 300 is superimposed on the descriptive display image, the icon group 300 prevents the vision of the display image by a presentation participant.

This embodiment shown in FIG. 1 has the following features as compared with the case of FIG. 2. First, the bit map files of the icons to be displayed and the display position data in the interactive white board device 1 are transmitted from the application provided in the PC 3 to the display device 2 through the communication cable 42 and stored therein. Further, with the use of the OSD display function of the display device 2, the icon bit maps are displayed in the display section 103 which is not superimposed on the display section 102 of the descriptive display image on the basis of the display position data.

Also, the display section 103 is defined as follows. For example, when the aspect ratio (a ratio of the lateral length to the vertical length) of the display section 101 in FIG. 1 is 16:9 as with a wide NTSC television, and the aspect ratio of the descriptive display image in the display section 102 is 4:3 (12:9) as with a standard NTSC television, a blank space occurs in the lateral direction of the display section 101. FIG. 1 shows a case in which the display device 2 moves the blank space to the left end side of the display section 101 according to an instruction from the PC 3, and the display section 103 is located and displayed in the blank space. It is needless to say that the blank space can be moved to the right end side according to an instruction from the PC 3. Also, it is possible that the blank spaces are located in both of the left end side and the right end side, and the display section 102 is moved to the central portion of the display section 101 for display.

For that reason, unlike the case of FIG. 2, in this embodiment, the icons 111 are not superimposed on the image displayed in the display section 102, and do not prevent the presentation participant from viewing the image. Because the presence or absence of the display of each icon can be instructed from the PC3, the present status can be preset to a status in which icons unnecessary in description by the presenter are eliminated. Further, the presenter can preset the location of the display section 103 of the icons to any one of the left end side and the right end side by the aid of the PC 3, according to whether the interactive white board 1 is located at the right side or the left side, or whether the presenter is right-handed or left-handed. As a result, the presenter moves the position for conducting the icon operation, thereby enabling the problem that the smooth progress of presentation is prevented to be eliminated.

The case in which the display section 103 of the icons is located with the use of the aspect ratio of the display section 101 and the descriptive display image was described. However, the present invention is not limited to this embodiment. The image can be reduced and displayed within a problem-free region to use a resultant blank space. Also, the display section 103 of the icons is not limited to the left end side or the right end side, but may be located at the upper end side or the lower end side. Even in the display section 102 of the descriptive display image, an image portion having no character information, or no fine information, such as sky or a puddle is detected so that the icons can be located in that image portion. In this case, there can be provided a function of automatically discriminating a portion suitable for the provision of the icons. As a result, the icons do not prevent the presentation participant from viewing the images.

Figure 3:
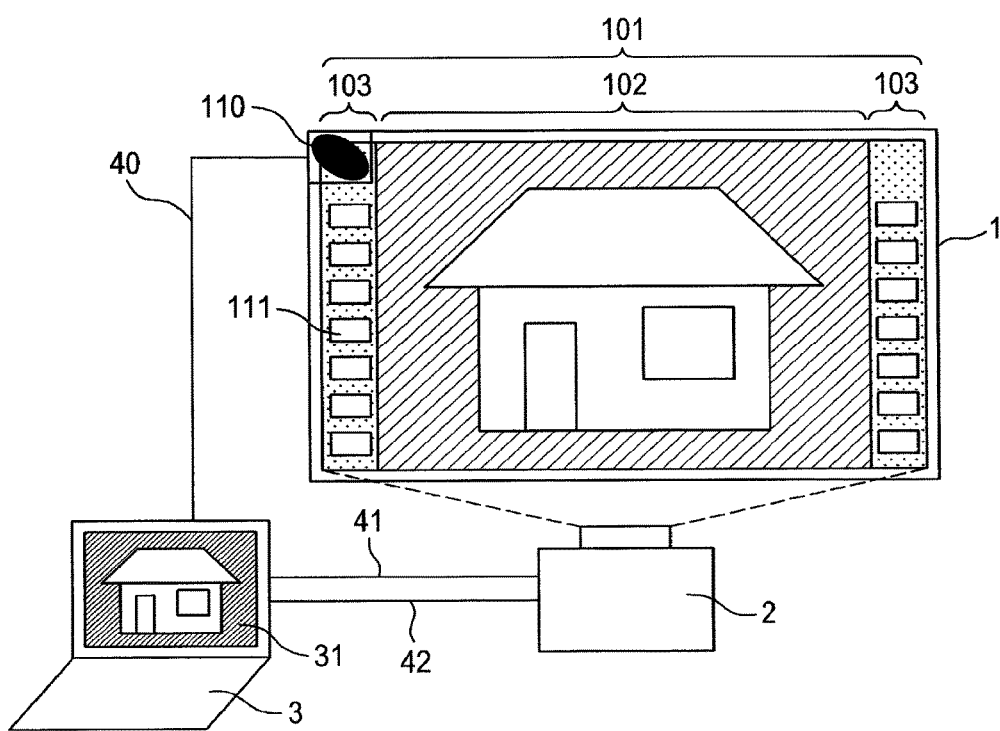
FIG. 3 is a block diagram illustrating another presentation system according to the embodiment of the present invention.

FIG. 3 is a block diagram of another presentation system according to the embodiment of the present invention. FIG. 3 shows a case in which the display sections 103 of the icons are located at both of the left end side and the right end side of the display section 101 as compared with FIG. 1. As described above, this arrangement can be implemented by giving an instruction on the display method to the display device 2 from the PC 3. For example, functions related to the operation of the PC 3 as will be described later can be arranged at the left end side, and functions related to the display device 2 can be arranged at the right end side so that the presenter can easily find any icon according to the functions.

In the above description, the interactive white board 1 is exemplified as a device that displays the image. However, the technique of this embodiment can be also implemented by a device having an LCD (liquid crystal display) or a PDP (plasma display panel) as the display section. As the position coordinate detection sensor for the electrical pen, a sensor that detects a pressure or an electromagnetic wave can be applied, likewise.

Similarly, the icons 111 of FIG. 1 can be associated with not only the function related to the operation of the PC 3 but also the function for allowing the presenter to operate the display device 2. For example, because the interest of the presenter participant is concentrated on the presenter when description using the displayed drawing has been terminated once, the drawing may be erased once. In this situation, a function for turning off an illumination optical system of the display device 2 including the liquid crystal projector, or blocking a light to the interactive white board device 1 corresponds to the latter function.

Further, because the icons 111 has the function not fixed as in the conventional art, the function of the icons 111 can be further extended by extending the application of the PC 3. For example, when a reproduced moving picture is supplied from a video player (not shown) to the display device 2, an icon for selecting any one of the reproduced moving picture and an image supplied from the PC 3 is newly provided. As a result, a system in which the PC 3 controls the display device 2 so as to selectively display the image to be displayed on the interactive white board device 1 can be realized, thereby enabling the effect of the presentation to be further enhanced.

Figure 4:
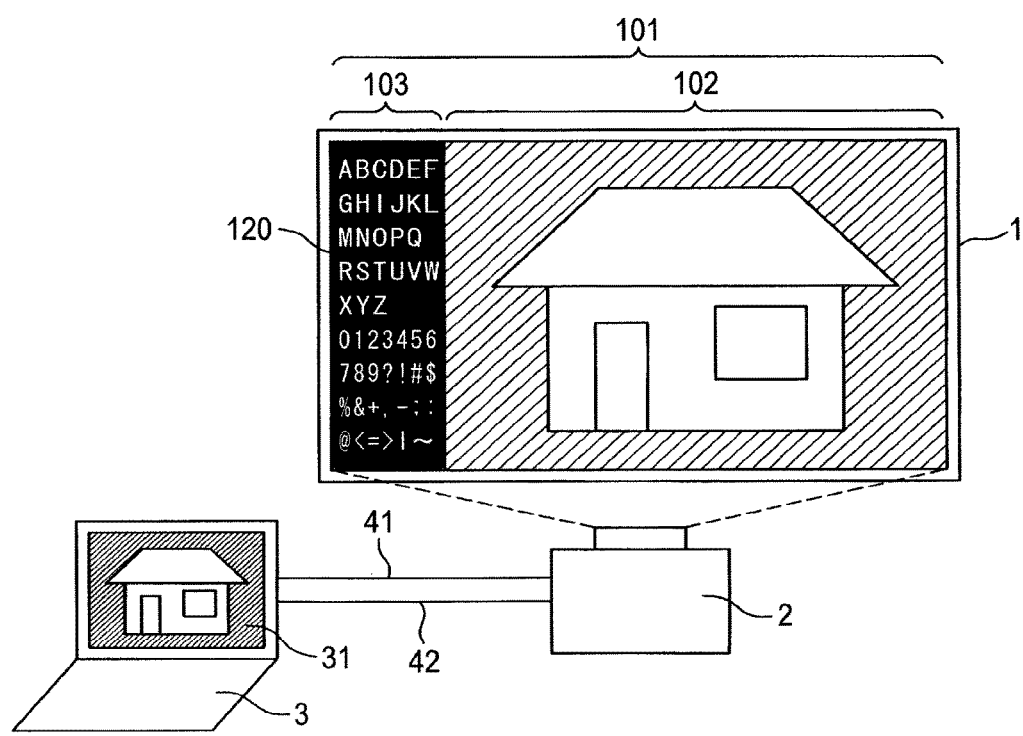
FIG. 4 is a block diagram illustrating still another presentation system according to the embodiment of the present invention.

Subsequently, still another embodiment of the present invention will be described with reference to FIGS. 4 to 6. FIG. 4 is a block diagram of still another presentation system according to the embodiment of the present invention. In this example, unlike FIG. 1, the display section 103 functions as not the display area of the icons 111 but a string display area 120 for message display. The string display area 120 is used to display supplemental description in presentation which has been prepared in advance, a formal name of abbreviation, or the like. Also, during presentation, the presenter or another operator can display a message by operating the PC 3. Although the position coordinate detection sensor 110 is omitted, the string display area 120 can be provided in the system that can display the icons 111 as shown in FIG. 1 by switching the display. When the PC 3 gives an instruction to the interactive white board device 1, an unfixed message with arbitrary contents can be displayed on the interactive white board device 1 as needed. It is needless to say that the string display area 120 can be located at not only the left end side of the display section 101 but also the right end side, the upper end side or the lower end side. Also, the operator may select whether the string display area 120 is so displayed as to be superimposed on the display section 102 of the descriptive display image, or not, by the PC 3. String data is, for example, data input from a keyboard (not shown) of the PC 3 by the operator, or data stored in a memory provided in the PC 3. The data is supplied to the display device 2 through the communication cable 42. As occasion demands, the display device 2 can store the string data supplied from the PC 3 in a nonvolatile memory.

Incidentally, when the display device 2 such as a liquid crystal projector displays a message, there arises a problem which will be described with reference to FIGS. 5 and 6. FIG. 5 is a diagram for explaining an example of a display method according to the embodiment of the present invention. FIG. 6 is a diagram for explaining another example of a display method according to the embodiment of the present invention.

Taking the actual use state of the display device 2 such as the liquid crystal projector into consideration, a manner of emitting a projection light from the direct front side of the interactive white board device 1 is rarely used. It is general to emit the projection light from a position at which the display device 2 is not impeditive when viewed from the presenter participant, for example, from the obliquely lower side or the oblique upper side. A case in which the projection light is emitted from the center in the horizontal direction and the oblique lower side in the height direction with respect to the interactive white board device 1 will be described.

In this case, the enlargement factor is more increased toward a portion displayed on the upper portion on the screen, and a distortion occurs in the display image. Accordingly, the display device 2 frequently has such a distortion correction function as to reduce the image displayed on the upper portion of the interactive white board device 1. In two images of FIG. 5, an upper image is an image to be projected by the display device 2 when the projection light is emitted from the direct front side in both of the horizontal direction and the height direction with respect to the interactive white board device 1. A lower image is an image to be projected by the display device 2 when the projection light is emitted from the oblique lower side only in the height direction. A broken light in FIG. 5 indicates a display region 104 corresponding to the display region in the interactive white board device 1. That is, when the projection light is emitted from the oblique lower side, an image signal is reduced toward the upper image in both of the vertical direction and the horizontal direction of the screen in the display device 2. As a result, the distortion can be corrected. After the image signal has been first reduced in the vertical direction by reducing scanning lines, processing in the horizontal direction is conducted on the image signal. Then, the projection light is emitted from the direct front side of the interactive white board device 1 to provide an image signal displayed in a trapezoidal shape as indicated by a lower image of FIG. 5. As a result, the image signal can be displayed without any distortion occurring in the entire surface of the display region 104. This can be called "Keystone display".

Incidentally, attention must be newly paid to the message display by reducing the image in the vertical direction as will be described later. In the display device 2, the above-mentioned processing in the vertical direction is first conducted on the image that is displayed in the display section 102. Thereafter, because the strings of a predetermined size are synthesized by OSD, the display section 103 becomes relatively larger than the display section 102 in the vertical direction. For that reason, in this embodiment, after the display section 102 has been displayed in the predetermined size, the number of lines of the strings which are displayed in the display section 103 is reduced. When a sufficient message display cannot be conducted by reducing the strings, the strings can be displayed by scrolling in the vertical direction by the display control section to read all of the strings every predetermined time.

Figure 5:
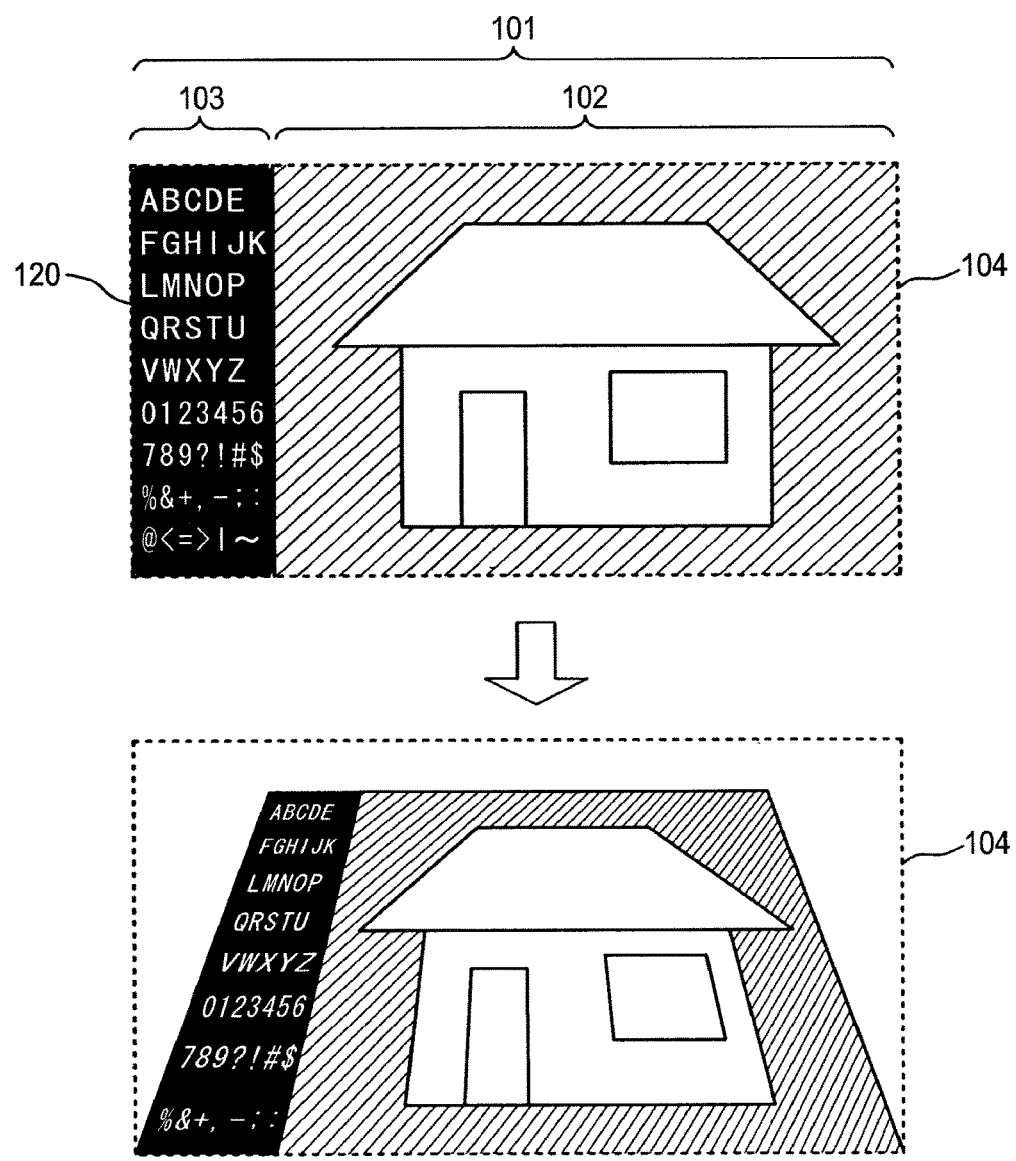
FIG. 5 is a diagram illustrating one example of a display method according to the embodiment of the present invention.
Figure 6:
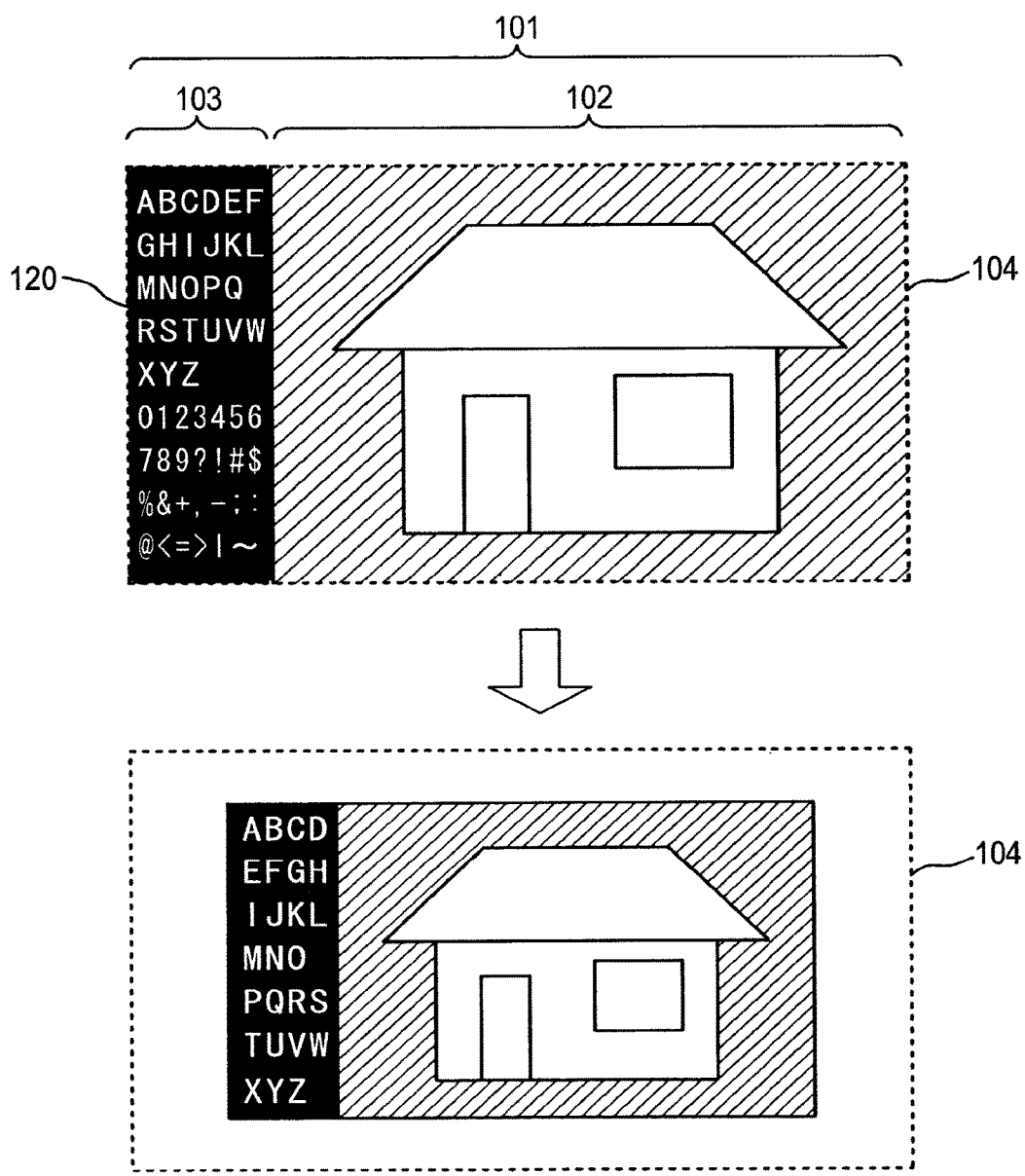
FIG. 6 is a diagram illustrating another example of a display method according to the embodiment of the present invention.

Unlike FIG. 5, FIG. 6 shows a case in which the electron zoom function provided in the display device 2 is effective. When the image is displayed in a state where the zoom ratio is high, an image signal reduced in both of the vertical direction and the horizontal direction is required in order to display the same angle of view as shown in a lower side of FIG. 6, as compared with a case where the zoom ratio is standard as shown in an upper side of FIG. 6.

In this case, in this embodiment, both of the number of strings that can be displayed and the number of characters per line are reduced. As mentioned above, when the sufficient message display cannot be executed, the strings can be displayed by scrolling in the vertical direction so as to display all of the strings every predetermined time.

Figure 7:
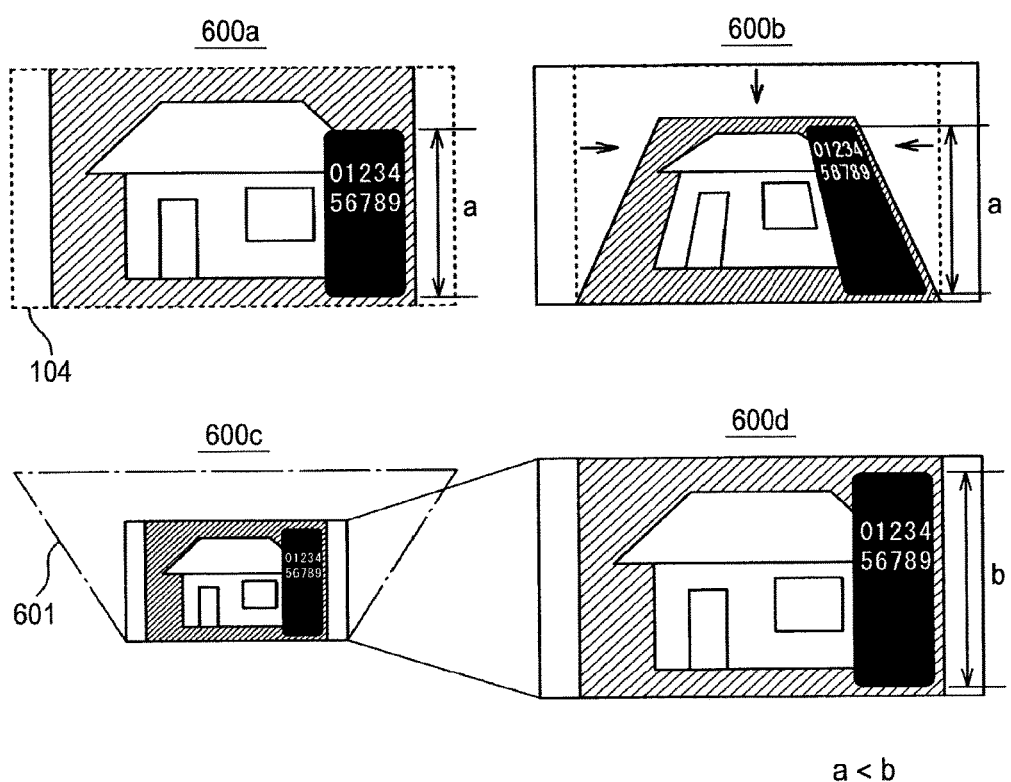
FIG. 7 is a diagram illustrating a relationship between distortion correction and OSD display according to the embodiment of the present invention.

The items described with reference to FIGS. 5 and 6 will be further described with an example of the OSD display with reference to FIG. 7. FIG. 7 is a diagram showing a relationship between the distortion correction and the OSD display according to the embodiment of the present invention.

Referring to FIG. 7, reference symbol 600*a* denotes an image that is displayed by the display device 2 from the direct front side of the interactive white board device 1. In this example, OSD display indicative of numeral is conducted in a portion corresponding to a height a in the vertical direction. In the case where the image is displayed from the oblique lower side of the interactive white board device 1, the above-mentioned distortion correction is executed, an image indicated by 600*b* is provided in an output section of the display device 2 to the interactive white board device 1 (corresponding to the image in the liquid crystal panel, for example, in the liquid crystal projector) is provided. That is, as will be described again later, after an image reduced in the vertical direction has been generated by the image processing section provided in the display device 2, the image is synthesized with the OSD image of a predetermined size (height a) by the OSD synthesis processing section, and the horizontal direction of the synthetic image is then reduced according to a position in the vertical direction by the distortion correction processing section.

When the image is displayed on the interactive white board device 1 from the oblique lower side by the display device 2, the relative enlargement factor is obtained as indicated by a dashed line 601 in reference symbol 600*c* in FIG. 7. Therefore, the image can be viewed from the presentation participant as indicated by reference symbol 600*d* in FIG. 7. That is, the image whose distortion has been corrected is obtained. However, when reference symbol 600*a* and 600*d* are compared with each other, the height of the OSD display portion is obtained as indicated by reference symbol b in FIG. 7, which is longer than the original height a.

Figure 8:
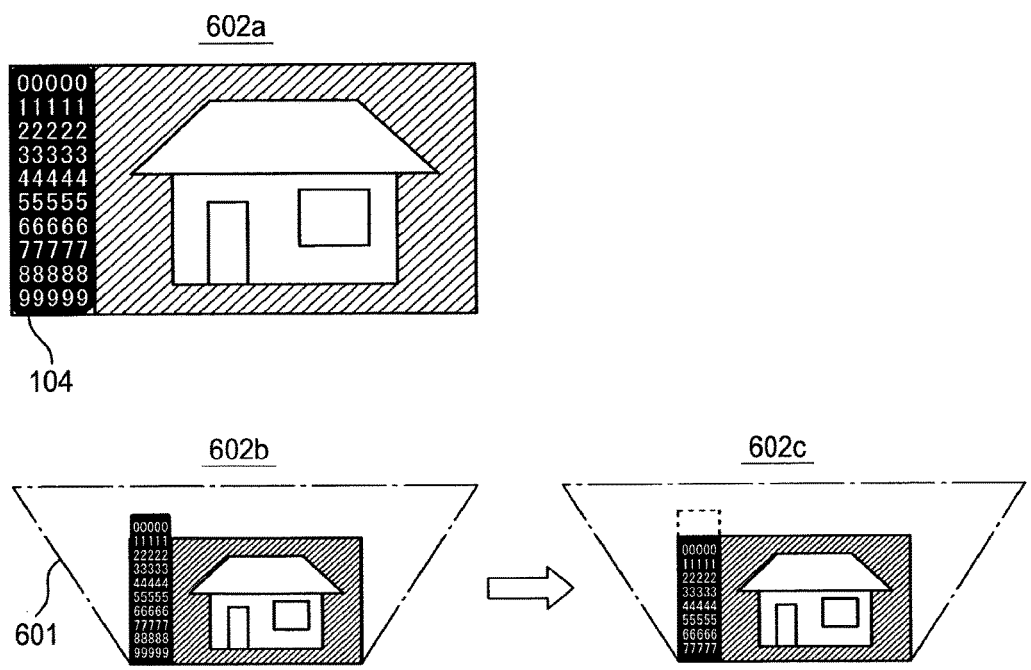
FIG. 8 is a diagram illustrating a relationship between the distortion correction and the OSD display according to the embodiment of the present invention.

The above items will be described with an example in which the OSD display is conducted entirely in the vertical direction with reference to FIG. 8. The same is applied to the above-mentioned message display shown in FIG. 4. FIG. 8 is a specific diagram showing a relationship between the distortion correction and the OSD display according to the embodiment of the present invention.

Referring to FIG. 8, reference symbol 602*a* indicates an image that is displayed from the direct front side of the interactive white board device 1 by the display device 2. In this example, the OSD display indicative of numerical is conducted at the left end side of the screen entirely in the vertical direction. When the image is displayed from the oblique lower side of the interactive white board device 1, the image is subjected to the above-mentioned distortion correction, and the image is displayed on the interactive white board device 1 from the oblique lower side by the display device 2, the relative enlargement factor is obtained as indicated by a dashed line 601 in reference symbol 602*b* in FIG. 8. When the image is displayed on the interactive white board device 1 as it is, the upper end portion of a numeral display portion in FIG. 8 gets out of the display region of the interactive white board device 1. For that reason, the number of lines displayed is reduced by the OSD display control section provided in the display device 2 so that the upper end falls within the display region, as indicated by reference symbol 602*c* in FIG. 8. When the number of lines to be displayed is short, scroll display can be conducted as described above. Similarly, in the embodiment where icons are displayed in the display section 103 of FIGS. 1 and 3, it is conceivable that the distortion correction is conducted, and the icon portion gets out of the display region of the interactive white board device 1. However, in this case, the display intervals of the icons can be reduced by the OSD display control section provided in the display device 2 so that the icon display falls within the display region.

Figure 9:
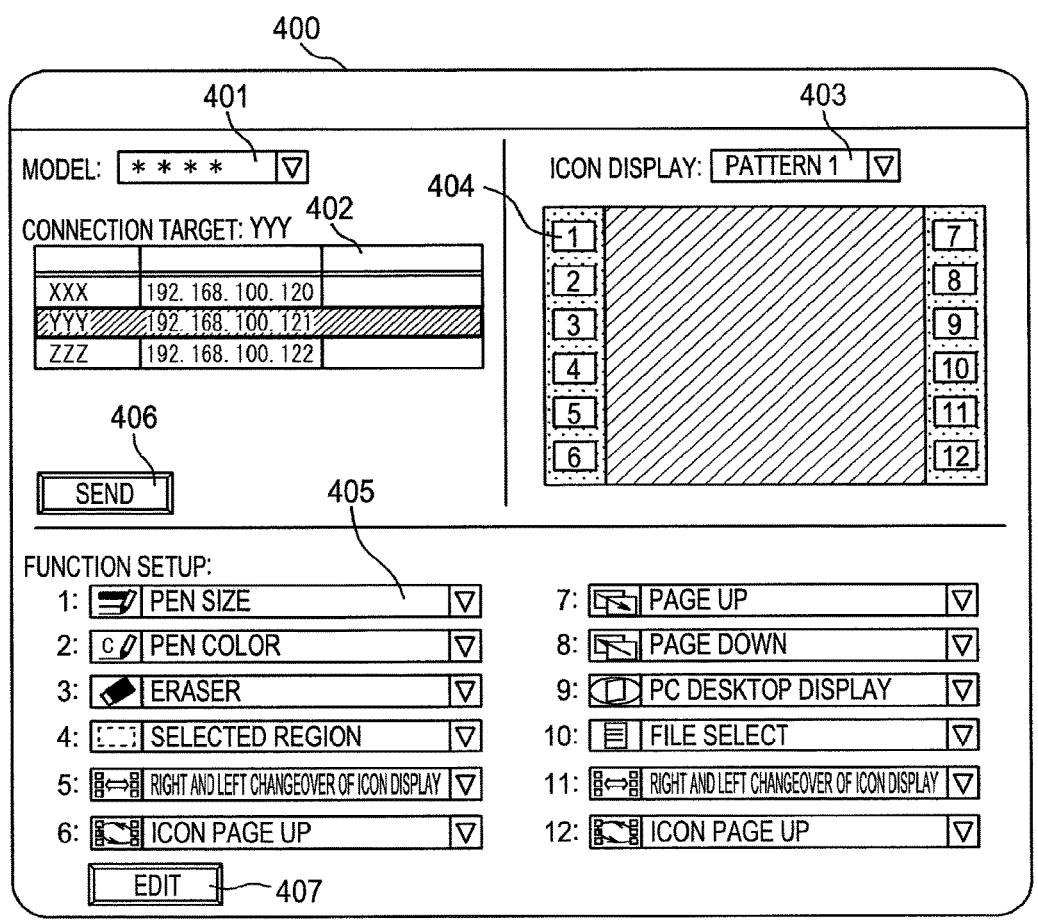
FIG. 9 is a diagram illustrating one example of a PC application screen according to the embodiment of the present invention.

Subsequently, returning to a case in which the icons are displayed in the display section 103 as shown in FIGS. 1 and 3, the set screen of the icons to be displayed in the PC 3, and the setting method will be described. FIG. 9 is a diagram showing one example of a PC application screen according to the embodiment of the present invention. FIG. 9 schematically shows an example of a PC application window 400 displayed on the display 31 provided in the PC 3 of FIG. 1. Examples different from FIG. 9 in the arrangement on the screen and so on can be proposed, but those examples fall within the scope of this embodiment.

A model select list 401 within the PC application window 400 is made up of, for example, pull-down menus. A model list of the display device 2 which can be controlled by the PC 3 is displayed by clicking an arrow at the right end with a mouse (not shown). The user selects a desired model from the list by clicking the model with the mouse. Then, a connection target of the selected model is displayed in a connection target select list 402. In this example, an example in which a name of the connection target and an IP address are displayed is shown. In this example, three models selected by the user are provided. Among those models, when a display device of the connection target "YYY" is used, the display device is clicked with the mouse for selection. As a result, the PC 3 starts transfer of information with respect to the display device 2 selected by the user.

Then, the icons are set. An example in which 12 kinds of icons are set is shown. The user selects the arrangement of a desired icon through the pull-down menu of an icon display pattern select list 403. When a pattern 1 is selected as shown in FIG. 9, the icons are so arranged as to be divided into the left end side and the right end side of the interactive white board device 1. When a pattern 2 and the subsequent patterns are selected, the icons are so arranged as to be concentrated on the left end side as shown in FIG. 1. When the icons are arranged at the upper end side and the lower end side, the arrangement of the icons according to a desire of the user can be selected.

In FIG. 9, in an icon display pattern 404 added with numerals of 1 to 12, its function is determined by setting the function in a function select list 405. In this case, the function of the icon display pattern 404 added with numerical of, for example, 1 is an icon for setting the size of a pen in the function select list 405. In FIG. 9, the function select list 405 with numerals of 1 to 12 has pull-down menus, and from those menus, the user selects the function of the icon display pattern 404. For example, the function of the icon display pattern 404 with numeral of 1 can be changed to an icon for setting the color of the pen. When the bit map files for displaying the respective functions and icons correspond one-to-one with each other, the icon display is also changed at the same time. In the function select list 405 shown in the figure are shown a large number of functions related to the control of the PC 3. However, the function related to the display device 2 such as ON/OFF function of display can be included in the function select list 405.

When the function is not set to the icon display pattern with numeral of, for example, 12, a portion written as, for example, "nothing" is selected from the pull-down menu in the function select list with numeral of 12 in the figure. In this situation, no icon is displayed in the subject display section of the interactive white board device 1. Also, the same icon display pattern is set in plural places, and the icons that are frequently used can be arranged, for example, on both of the left end side and the right end side of the interactive white board device 1 to improve the usability of the presenter.

The above display pattern can be set during presentation, but is usually preset in advance. After the display pattern has been completed, when a transmit button 406 is clicked, information related to the select, arrangement and the functions of the icon are transmitted to the display device 2 from the PC 3, and then stored in a memory provided in the display device 2. When an edit button 407 is clicked, a new function can be added to the function select list 405, or the bit map patterns of the icons can be edited.

Subsequently, the structure of the information related to the select, arrangement and functions of the icons which are transmitted to the display device 2 from the PC 3 will be described with reference to FIG. 10. FIG. 10 is a diagram showing a format of the icon information according to the embodiment of the present invention.

Referring to FIG. 10, reference numeral 1001 indicates display position of the respective icons in the interactive white board device 1. An example in which the display positions are divided in the vertical direction and the horizontal direction for designation is shown. Although the number of bits is changed even according to the number of scanning lines and the number of display pixels, the number of bits is so selected as to obtain the position information with a predetermined precision. Because each icon has a predetermined size, if the information on the display position has a precision for each pixel, the icon can be displayed in a predetermined region around the designated position, or in a predetermined region with the designated position set as, for example, the left upper end. The identification of an icon when the electrical pen points at the icon as described above can be conducted with the use of the position information in the same manner.

Reference numeral 1002 denotes Nos. added with the bit map files of the subject icons. For example, when the types of bit map files are 256 or lower, the number of bits may be 8 bits. Reference numeral 1003 denotes information on an encoded icon function corresponding to the selected icon. When the user sets the functions of the respective icons by the aid of the function select list 405 shown in FIG. 9, the bit maps and functions of the icons in the respective display positions 1001 are set.

Reference numeral 1004 denotes information indicative of whether there is the icon display in the interactive white board device 1, or not. For example, when the icons are set so as not to be displayed in a specific place in the function select list 405 as described above, this information announces this fact. When an agreement is made in advance so as not to display the icons in the case where no instruction is given to the icon function 1003, the display presence/absence 1004 may be unnecessary.

As described above, when the information shown in FIG. 10 is transmitted to the display device 2 from the PC 3, the display of the icons in the interactive white board device 1 can be controlled.

Figure 11:
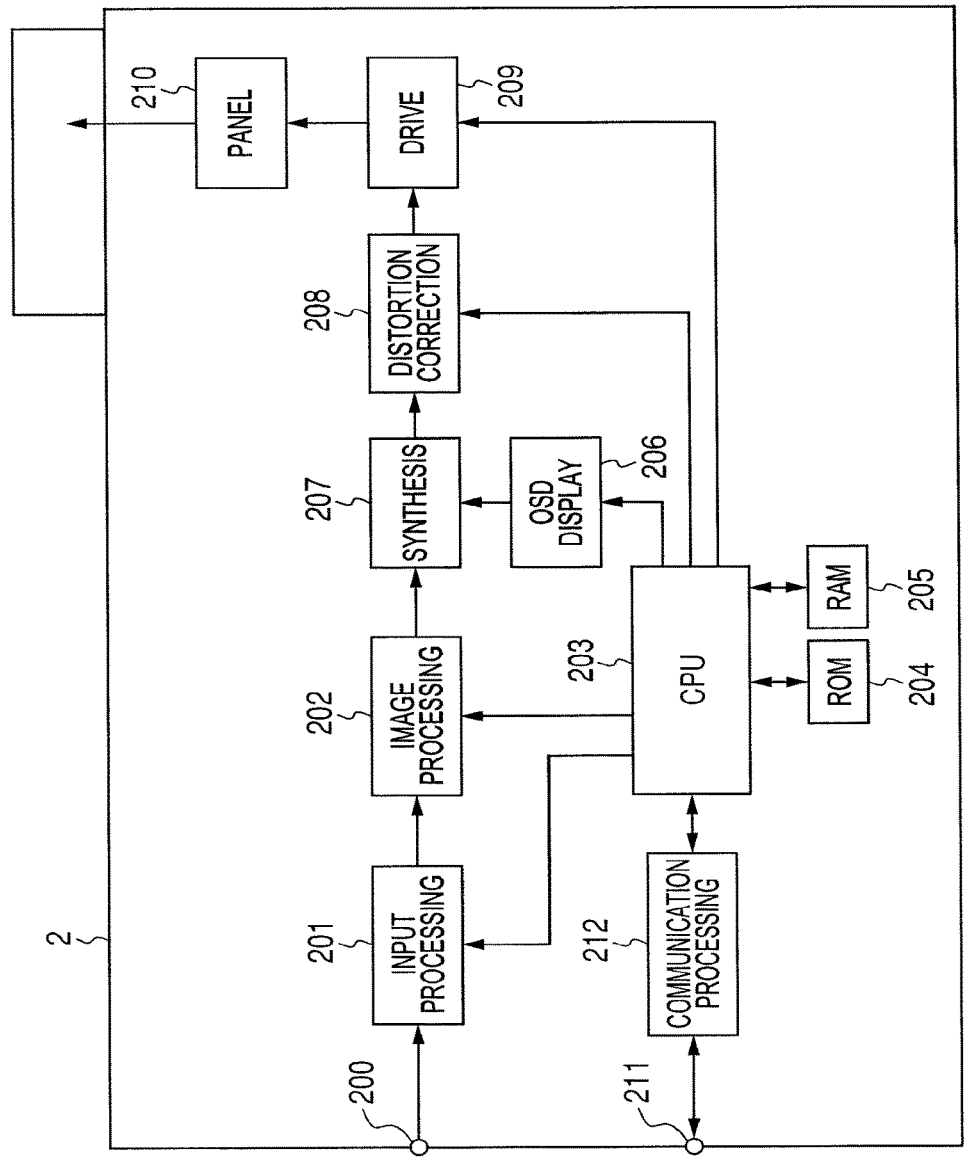
FIG. 11 is a block diagram illustrating a display device according to the embodiment of the present invention.

Subsequently, the configuration of the display device 2 will be described with reference to FIG. 11. FIG. 11 is a block diagram of the display device according to the embodiment of the present invention. In this example, a case in which the Keystone display described with reference to FIG. 5 is conducted will be described.

Referring to FIG. 11, an input terminal 200 is connected with the image cable 41 of FIG. 1, and an information signal of the descriptive display image which is supplied by the PC 3 is input to the display device 2. The input signal is received by an input processing section 201, and output to an image processing section. A part of processing for the Keystone display described above with reference to FIG. 5 is conducted in the image processing section 202. Processing of reducing the number of scanning lines or the like is conducted as a part of processing that executes distortion correction to reduce the vertical direction, according to an instruction from a control section (also called "display device control section") 203 including a CPU (central processing unit). The control section 203 executes the above-mentioned instruction based on the projection angle with respect to the interactive white board device 1. The image processing section 202 also converts the aspect ratio, the zoom ratio, and the number of display pixels as occasion demands, according to an instruction from the control section 203. An output signal of the image processing section 202 is input to one end of an OSD synthesis processing section 207, and subjected to OSD synthesis as will be described later.

Subsequently, a signal that is input to the other end of the OSD synthesis processing section 207 will be described.

An input/output terminal 211 is connected with the communication cable 42 of FIG. 1, and a command for control is transferred between the PC 3 and the display device 2. The information related to the icon display described above with reference to FIGS. 9 and 10 is also supplied together with the control command. The information related to the icon display is divided by the communication processing section 212 and supplied to the control section 203. The information is further supplied to an OSD display control section 206 through the control section 203. An OS (operating system) and application of the control section 203 are stored in a ROM 204, and the running information of the control section 203 is temporarily stored in the RAM 205.

In the OSD display control section 206, the icons or the message images to be synthesized with the above-mentioned image in the OSD synthesis section 207, on the basis of information on the bit maps or the display position of the icons which has been supplied through the control section 203, or on the basis of character fonts that have been supplied from a built-in font ROM, are supplied to the above-mentioned other end of the OSD synthesis section 207.

The image signal that has been synthesized in the OSD synthesis section 207 is subjected to the other parts of processing for conducting the distortion correction by the distortion correction processing section 208. That is, the horizontal direction is reduced according to the position in the vertical direction, and converted into an image signal which is displayed in a trapezoidal shape when the projection light is emitted from the direct front side of the interactive white board device 1 as shown in FIG. 5. The degree of reduction is determined according to an instruction from the control section 203.

After an output signal of the distortion correction processing section 208 has been amplified in power until a liquid crystal panel 210 can be sufficiently driven by a panel drive control section 209, the output signal controls the permeability of the liquid crystal panel 210. As well known, the liquid crystal panel 210 is disposed for each of three primary color signals of RGB. Also, a projection light is supplied to the liquid crystal panel 210 from an illumination optical system not shown. The three primary color lights of RGB that have transmitted the liquid crystal panels 210 are emitted to the interactive white board device 1 through a lens group forming a projection optical system not shown to display an image.

Figure 12:
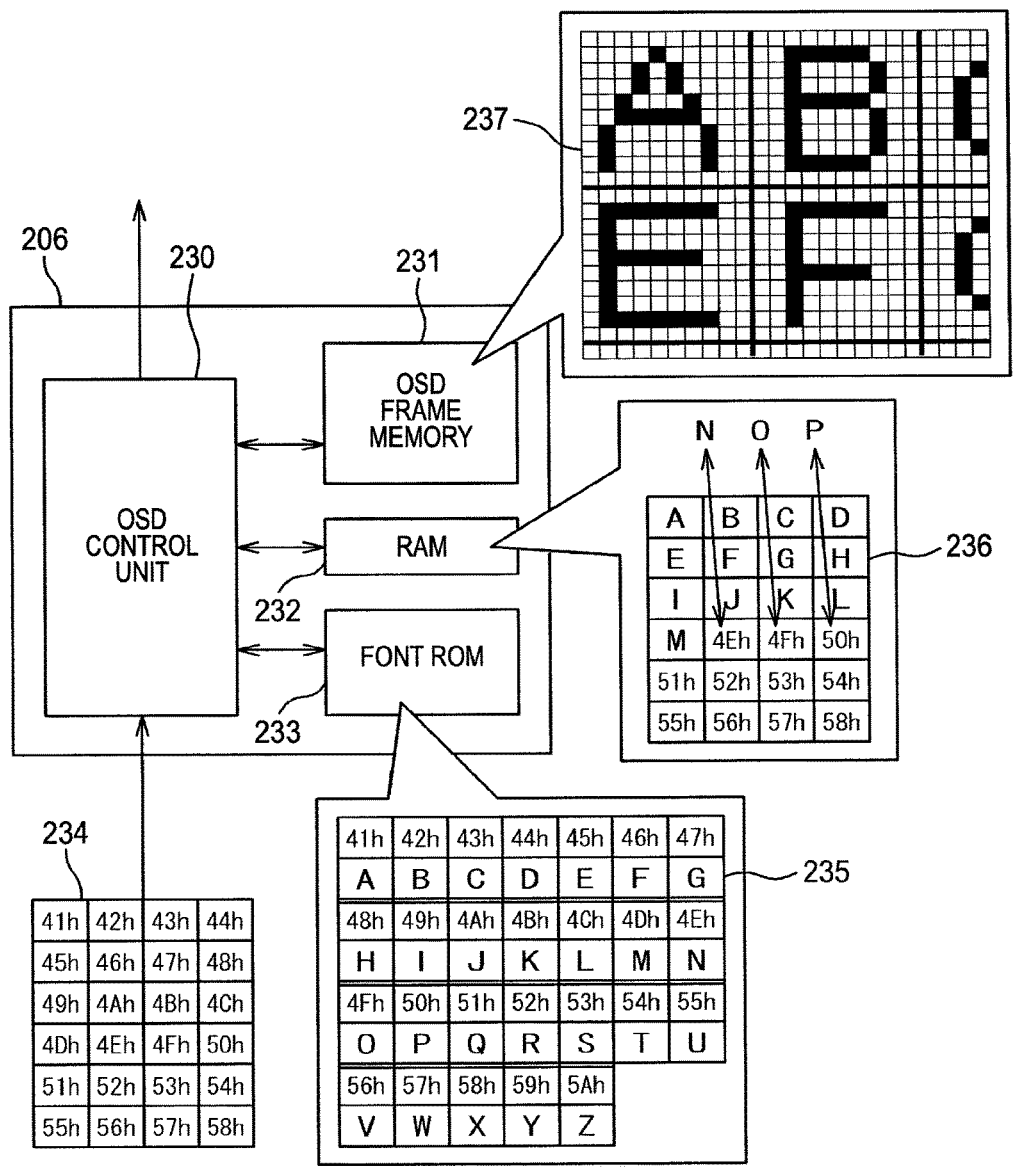
FIG. 12 is a block diagram illustrating an OSD display section of a display device according to the embodiment of the present invention.

The configuration of the OSD display control section 206 shown in FIG. 11 will be described with reference to FIG. 12. FIG. 12 is a block diagram showing an OSD display section of the display device according to the embodiment of the present invention. A case in which message display strings are generated on the basis of a control from the PC 3 will be described.

To an OSD control section 230 provided in the OSD display control section 206 is input information related to characters which are displayed from the above-mentioned control section 203. The information is input as binary code data 234 supplied from the PC 3 as shown in the figure. The binary code data 234 includes data representing corresponding characters and data representing the display position. The OSD control section 230 is connected with a font ROM 233. The font ROM 233 has a correspondence table 235 of the respective binary codes and characters. Referring to the font ROM 233, the OSD control section 230 replaces the respective input binary codes with character bit maps 236, and stores the bit maps 235 in a RAM 232. For example, when the binary code is 4Eh, the OSD control section 230 stores the bit map of the character N therein. Thereafter, referring to the bit maps 236 stored in the RAM 232, the OSD control section 230 renders the image in a place corresponding to the display position of the OSD frame memory 231. An example of the rendered results is indicated by reference numeral 237 in FIG. 12. Data that has been stored in the OSD frame memory 231 is supplied to the other end of the above-mentioned OSD synthesis processing section 207 through the OSD control section 230. In this situation, the OSD control section 230 determines the number of lines in displaying the image on the interactive white board device 1, or also determines the number of characters per line in zoom display, for example, on the basis of information on the projection angle to the interactive white board device 1. The OSD control section 230 conducts the scroll display as described above as occasion demands. When the icon display shown in FIG. 1 is conducted, information related to the bit map files of the icons is supplied from the PC 3 to the display device 2, stored in the RAM 232, and rendered in the OSD frame memory 231.

Figure 13:
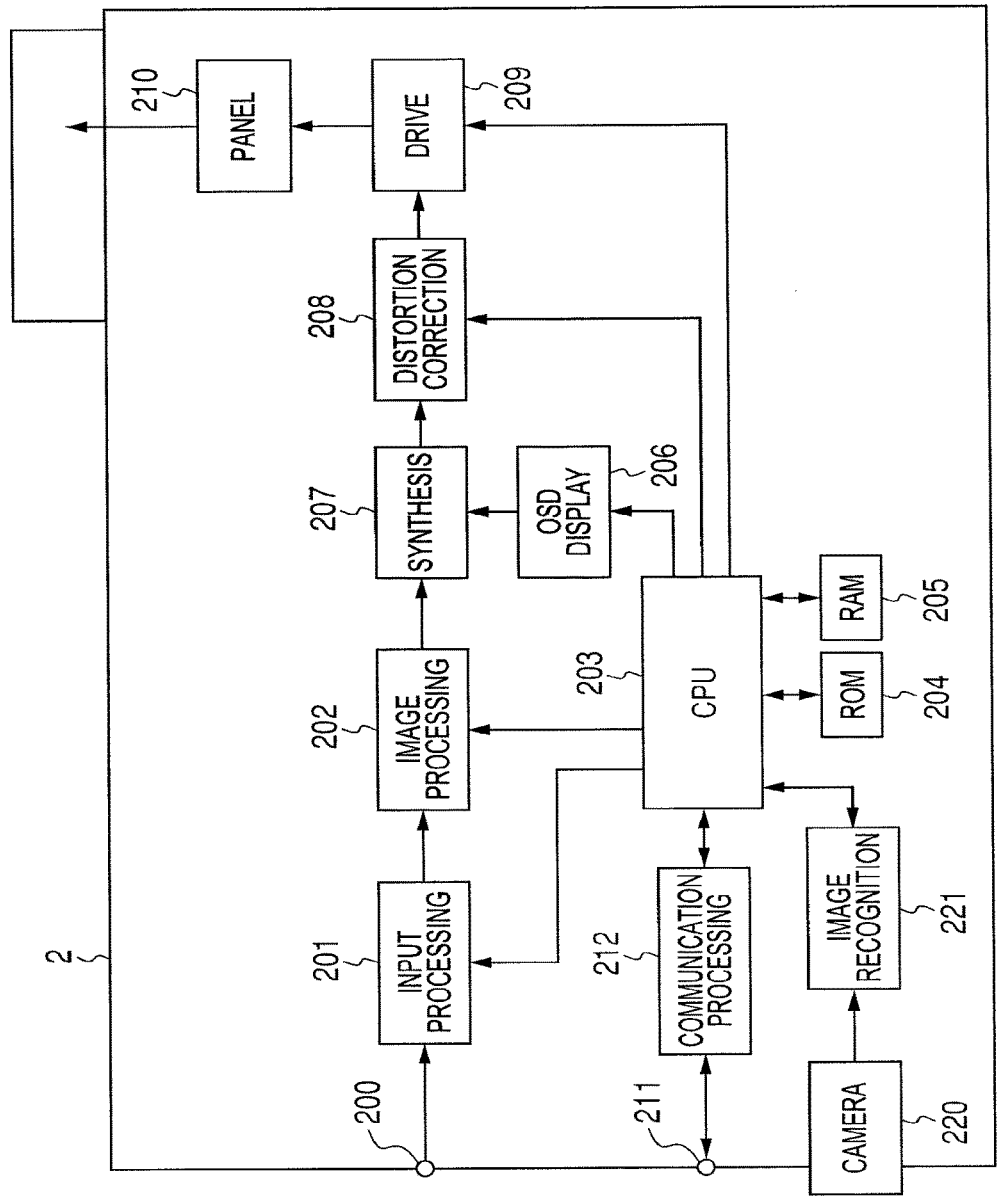
FIG. 13 is a block diagram illustrating another display device according to the embodiment of the present invention.

Subsequently, an example in which the determination of the icon pointed by the electrical pen is conducted by the aid of not the position coordinate detection sensor 110, but an image pickup section (camera) provided in the display device 2 will be described with reference to FIG. 13. FIG. 13 is a block diagram of another display device according to the embodiment of the present invention. Unlike the case of FIG. 11, a camera 220 and an image recognition processing section 221 are newly provided, and the image recognition processing section 221 transfers control information with respect to the control section 203. Also, when the icon pointed by the electrical pen is related to the function of the PC 3, the control section 203 transmits detected information to the PC 3 through the communication processing section 212 and the input/output terminal 211.

The camera 220 points to the interactive white board device 1 that displays the image projected by the display device 2. When the presenter points at the icon with the electrical pen, the icon at which the image recognition processing section 221 has pointed is detected, and informed the control section 203 to on the basis of the image detected by the camera 220. Incidentally, the presenter participant who views the image displayed on the interactive white board device 1 from the direct front position can see the image looking like the rectangular image shown in the upper half of FIG. 5, as the trapezoidal image shown in the lower half of FIG. 5 when the image is viewed from the position of the display device 2 that emits the light from the front and oblique lower side. For that reason, more improvement is required to precisely detect the icon that has been pointed by the electrical pen from the image detected by the camera 220.

In this embodiment, the image recognition processing section 221 obtains the original position of the icon detected by the camera 220 on the basis of the information of the projection angle to the interactive white board device 1 which is supplied from the control section 203 to precisely detect the icon. Also, for example, corners (for example, four corners) of the display image are pointed by the electrical pen before presentation, this image is detected by the camera 220, and the position information is informed the control section 203 to through the image recognition processing section 221. During the subsequent presentation, the positions of the respective icons which have been detected by the camera 220 are corrected on the basis of the position information to precisely detect the icons.

Figure 14:
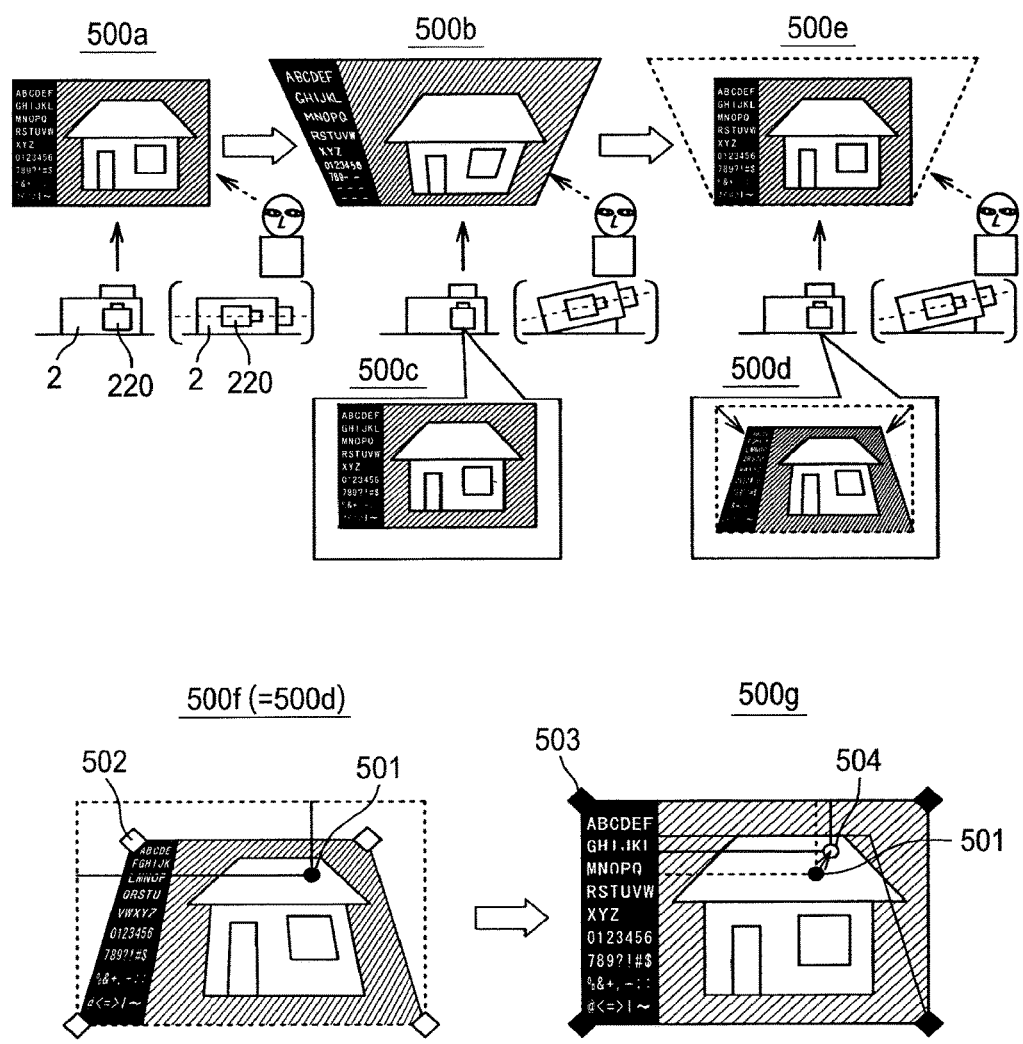
FIG. 14 is a diagram for explaining differences in vision according to the embodiment of the present invention.

This item will be described in more detail with reference to FIG. 14. FIG. 14 is a diagram for explaining differences in vision according to the embodiment of the present invention.

First, reference symbol 500*a* in FIG. 14 shows a case in which the display device 2 projects the image from the direct front side to the interactive white board device 1. In this case, not only the presenter participant but also the camera 220 incorporated into the display device 2 can view a rectangular image with no distortion. This case suffers from no problem.

Reference symbol 500*b* shows a case in which the display device 2 projects the image from the oblique lower side to the interactive white board device 1, and the presenter participant views the image. The image is not subjected to the distortion correction as described above. The enlargement factor becomes larger toward the upper side of the image, and the image is viewed as an inverted trapezoidal image. When the same image is viewed at the position of the camera 220 incorporated into the display device 2, the image is viewed as the same rectangular image as that of 500*a* as shown by reference symbol 500*c*. Because the camera 220 travels integrally with the display device 2, the camera 220 is held in parallel to the optical axis so that the image is viewed as the rectangular image.

On the other hand, in the case where the image has been subjected to the distortion correction, converted into an image shown by reference symbol 500*d*, and projected, the image is viewed as a trapezoidal image shown by reference numeral 500*d* when the image is viewed at the position of the camera 220 incorporated into the display device 2. The image is viewed by the presenter participant as a rectangular image with no distortion as shown by reference symbol 500e.

A state of reference symbol 500d is shown again as reference numeral 500f in the lower portion of the figure. It is assumed that the presenter points at the position of reference numeral 501 in the figure, when viewed from the camera 220. The position of reference numeral 501 is located at the upper portion of the image. When viewed at the angle of view of the camera 220 indicated by a broken line in the figure, an error occurs because the camera 220 detects the position as a position closer to the center from the real position. Under the circumstances, before presentation, four corners of the image indicated by reference numeral 502 are pointed by the electrical pen, and the position information detected by the camera 220 is stored, compared with correct position information, and corrected to precisely detect the position. As a result, as shown by reference numeral 500g, the positions of the four corners are precisely detected to positions indicated by reference numeral 503. It is found by conducting proportional calculation corresponding to the positions in the vertical direction and the horizontal direction at the same ratio that the above-mentioned position indicated by reference numeral 501 is precisely a position indicated by reference numeral 504. Thus, the correct position can be detected. This process can be implemented by conducting arithmetic operation in the image recognition processing section 220 provided in the display device 2.

As has been described above, in this embodiment, the display positions of the icons can be switched according to the desire of the user. The icons to be displayed can be chosen, and a new function can be loaded. The icons are not superimposed on the image used for presentation, and do not visually interrupt the image. Not only the operation of the PC but also the operation of the display device such as the liquid crystal projector can be conducted by the aid of the icons. When the image is projected from a position other than the direct front side, the number of lines of messages to be displayed can be optimally selected even if distortion is corrected. Also, the correct detection can be conducted even when the position is detected by the camera incorporated into the display device.

The above embodiment is exemplified and does not limit the present invention. Different embodiments are proposed on the basis of the subject matter of the present invention, but those embodiments do not depart from the scope of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A display apparatus that optically emits an image to a display surface of an interactive white board to display the image, comprising:
   an input section that receives an image from an external apparatus; a communication section that is able to communicate with the external apparatus; an OSD display image generating section that generates a message display image based on string data acquired from the external apparatus via the communication section; and
   an image synthesis processing section that is able to generate a synthetic image by synthesizing an input image input from the external apparatus through the input section with the message display image generated by the OSD display image generating section,
   when the input image is received from the external apparatus through the input section, the string data is received from the external apparatus through the communication section, and selection information capable of switching whether the input image and the message display image are synthesized to be superimposed on each other or the input image and the message display image are synthesized not to be superimposed on each other is received from the external apparatus through the communication section,
   the image synthesis processing section generates a synthetic image in which a display position of the message display image relative to the input image is changed based on the selection information,
   wherein the image synthesis processing section changes a type of the synthetic image among two types of synthetic images based on the selection information, wherein the two types of synthetic image are:
   a first type of the synthetic image in which the input image and the message display image are synthesized to be superimposed on each other, and in which the message display image is arranged inside of a display region of the input image; and
   a second type of the synthetic image in which the input image and the message display image are synthesized not to be superimposed on each other, and in which the message display image is arranged at a position at one side end of the synthetic image and outside of the display region of the input image wherein when the input image and the message display image are synthesized not to be superimposed on each other, the image synthesis processing section generates the synthetic image so that the message display image is displayed on a portion generated due to a difference between an aspect ratio of a range in which the display apparatus is able to optically emit an image to display the image and an aspect ratio of the input image in the range.

2. A projection type display apparatus, comprising:
   an input section that receives an image from an external apparatus;
   a communication section that is able to communicate with the external apparatus; an OSD display image generating section that generates a message display image based on string data acquired from the external apparatus via the communication section;
   an image synthesis processing section that is able to generate a synthetic image by synthesizing an input image input from the external apparatus through the input section with the message display image generated by the OSD display image generating section;
   a projecting section that projects the synthetic image generated by the image synthesis processing section,
   when the input image is received from the external apparatus through the input section, the string data is received from the external apparatus through the communication section, and selection information capable of switching whether the input image and the message display image are synthesized to be superimposed on each other or the input image and the message display image are synthesized not to be superimposed on each other is received from the external apparatus through the communication section, the image synthesis processing section generates a synthetic image in which a display position of the message display image relative to the input image is changed based on the selection information, wherein the image synthesis processing section changes a type of the synthetic image among two types of synthetic images based on the selection information, wherein the two types of synthetic images are:

a first type of the synthetic image in which the input image and the message display image are synthesized to be superimposed on each other, and in which the message display image is arranged inside of a display region of the input image; and a second type of the synthetic image in which the input image and the message display image are synthesized not to be superimposed on each other, and in which the message display image is arranged at a position at one side end of the synthetic image and outside of the display region of the input image wherein when the input image and the message display image are synthesized not to be superimposed on each other, the image synthesis processing section generates the synthetic image so that the message display image is displayed on a portion generated due to a difference between an aspect ratio of a range in which the projection type display apparatus is able to optically emit an image to display the image and an aspect ratio of the input image in the range.

* * * * *